US008509701B2

(12) United States Patent
Selén et al.

(10) Patent No.: US 8,509,701 B2
(45) Date of Patent: Aug. 13, 2013

(54) METHOD AND APPARATUS RELATING TO SPECTRUM SENSING

(75) Inventors: Yngve Selén, Uppsala (SE); Jonas Kronander, Uppsala (SE); Hugo Tullberg, Nyköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 316 days.

(21) Appl. No.: 12/990,880

(22) PCT Filed: Jun. 1, 2009

(86) PCT No.: PCT/SE2009/050634
§ 371 (c)(1),
(2), (4) Date: Nov. 3, 2010

(87) PCT Pub. No.: WO2009/148393
PCT Pub. Date: Dec. 10, 2009

(65) Prior Publication Data
US 2011/0065471 A1   Mar. 17, 2011

Related U.S. Application Data

(60) Provisional application No. 61/058,668, filed on Jun. 4, 2008.

(51) Int. Cl.
*H04B 17/00* (2006.01)
(52) U.S. Cl.
USPC .......................................... 455/67.11; 64/509
(58) Field of Classification Search
USPC ......................... 455/67.11, 509, 64
See application file for complete search history.

(56) References Cited

U.S. PATENT DOCUMENTS
2007/0032254 A1   2/2007   Chen

FOREIGN PATENT DOCUMENTS
CN            1878014 A      12/2006
CN          101155423 A       4/2008
WO    WO 2007/082036 A1      7/2007

OTHER PUBLICATIONS
Erpek et al. "Dublin Ireland Spectrum Occupancy Measurements Collected on Apr. 16-18, 2007", Shared Spectrum Company (2007).
Ghasemi et al. "Opportunistic Spectrum Access in Fading Channels Through Collaborative Sensing" *Journal of Communications*, 2(2):71-82 (2007).

(Continued)

*Primary Examiner* — Edward Urban
*Assistant Examiner* — Hsin-Chun Liao
(74) *Attorney, Agent, or Firm* — Myers Bigel Sibley & Sajovec, P.A.

(57) ABSTRACT

The invention presents methods and corresponding devices for improving cooperative spectrum initiating sensing. A device (61;61.1) first receives an invitation (17;35) to participate in cooperative spectrum sensing. The device performs an autonomous decision (19) on whether or not to participate in the cooperative spectrum sensing in response to the invitation. If it is determined to participate in the cooperative spectrum sensing to which the invitation relates, spectrum sensing is then performed (21;45). With the invention, sensor selection becomes "distributed", i.e. it is up to the device itself to decide on participation in the cooperative sensing, rather than having, for example, a central entity determining what devices should act as sensors in the cooperative spectrum sensing. One advantage is that the amount of signalling required for sensor selection can be kept at a minimum, thereby saving communication resources.

17 Claims, 7 Drawing Sheets

(56) References Cited

OTHER PUBLICATIONS

Ghasemi et al. "Spectrum sensing in cognitive radio networks: the cooperation-processing tradeoff" *Wireless Communications and Mobile Computing* 7:1049-1060 (2007).
International Preliminary Report on Patentability, PCT Application No. PCT/SE2009/050634, Aug. 17, 2010.
International Search Report, PCT Application No. PCT/SE2009/050634, Sep. 18, 2009.
Lee et al. "Multiple Access-Inspired Cooperative Spectrum Sensing for Cognitive Radio" *IEEE Military Communications Conference* (2007): 1-6.
Written Opinion of the International Preliminary Examining Authority, PCT Application No. PCT/SE2009/050634, May 3, 2010.
Chinese First Office Action Corresponding to Chinese Patent Application No. 200980120698.8; Issuing Date: Dec. 5, 2012; Foreign Text, 5 Pages, English Translation Thereof, 5 Pages.

Table: Probability Function Selection

+ information from initiating node
    - need parameter
    - specification of predefined function + selection based on previous sensing involvement + selection based on target number
    - $<N> = N_{target}$
    - $Pr(N \geq N_{target}) = P_{OK}$
    - $Pr(N \geq N_{target}) \geq P_{OK}$

Fig. 11

METHOD AND APPARATUS RELATING TO SPECTRUM SENSING

CROSS REFERENCE TO RELATED APPLICATIONS

This application is a 35 U.S.C. §371 national stage application of PCT International Application No. PCT/SE2009/050634 on 1 Jun. 2009, which itself claims priority to U.S. Provisional Patent Application No. 61/058,668, filed 4 Jun. 2008, the disclosure and content of both of which are incorporated by reference herein in their entirety. The above-referenced PCT International Application was published in the English language as International Publication No. WO 2009/148393 A1 on 10 Dec. 2009.

TECHNICAL FIELD

The present invention pertains to the field of radio communications, and in particular to the part of this field where spectrum utilisation is based on cooperative spectrum sensing.

BACKGROUND

Recent research has shown that usage of the radio spectrum is often fairly inefficient. One key factor in this is the current spectrum licensing system. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum. One approach pursued in regulations has been to license spectrum to a licensee (primary user), while at the same time allowing the licensed frequency band to be used by other users (secondary users) under the condition that they do not introduce harmful interference to the system operation of the primary user. Another approach under discussion is to have completely unlicensed spectrum, which has to be shared with equal right among many users.

New notions and terminologies have been developed in the effort to introduce a more flexible and efficient use of the radio spectrum.

One new term is Dynamic Spectrum Access, which describes spectrum access where radio units are not limited to using only a specific spectrum band (such as their licensed spectrum), but rather adapt the spectrum they use depending on conditions such as estimated throughput and latency requirements, spectrum availability etc. For instance, a cellular system suffering from high load in its own licensed spectrum could dynamically access spectral bands owned by some other licensee to temporarily increase its throughput, as long as it does not cause unacceptable interference to the primary system, or a network of communicating nodes may change its operating frequency depending on current spectral conditions. Potentially, dynamic spectrum access can enable more efficient use of the limited resource that radio spectrum is. This is because several systems then share the same resources such that when one system requires only a small amount of spectrum, other systems experiencing higher loads can utilize a greater bandwidth.

Another important notion is spectrum-on-demand, which means that radio nodes only operate as unlicensed (or secondary) users in a spectral band when triggered to do so. One reason for the radio nodes to initiate communication over unlicensed frequency bands could be that a licensed frequency band (if any) can not fulfill desired needs. Such events may occur, e.g., during peak hours at central stations, during special events such as concerts or sport events, or when several users in the same cell each demand a high bandwidth.

The spectrum-on-demand scenario usually looks slightly different depending upon the structure of the network, which may be both centralized and decentralized (autonomous).

A centralized network has a main (or central) node which has a controlling function over the network. Examples of centralized networks are the common cellular networks employed today for mobile communication, in which the main node (typically a base station (BS)) handles all communication with other nodes (user equipments UEs)) within a cell. Another example of a centralized network is an ad hoc network in which a master node (a function which may be given and handed over to any node in the network) has a regulating function over the other nodes.

In a decentralized network, all nodes are essentially equal (i.e. no node can control the operation of another node) and operate and communicate autonomously. Spectrum use is performed according to predetermined rules, or etiquette. If a node experiences an increased bandwidth demand, it can increase its use of a shared spectrum, if neighbouring nodes are willing to reduce their spectrum use. Alternatively the node can try to detect and access unused spectrum (which does not necessarily have to be shared with the other nodes) to meet the demand.

A concept, which relates to both centralized and decentralized networks (as well as to Dynamic Spectrum Access in general), is so-called spectrum sensing (sensing hereinafter). Sensing is the act of determining, by monitoring radio transmissions, whether e.g. a particular spectrum band is currently at least in part free for use. That is, sensing is a way of finding spectrum opportunities (e.g. various forms of radio resources), which may be accessed in a dynamic, and possibly secondary, manner. A device which takes part in the sensing is usually referred to as a sensor. Various network nodes, such as user equipments and base stations, may act as sensors. Since spectrum opportunities which are identified by sensing can be viewed as somewhat unreliable, they may be used for transmissions that are considered to be non time-critical.

It has been shown, e.g. in A. Ghasemi, E. S. Sousa, "Opportunistic Spectrum Access in Fading Channels Through Collaborative Sensing," Journal of Communications, vol. 2, no. 2, pp. 71-82, March 2007, that several sensors which experience, at least to some extent, uncorrelated fading (with respect to the possible signals to which the sensing is applied) are required for high reliability. This is because a single sensor may be in a deep fade, which makes it virtually impossible to detect a current usage of spectrum resources. Therefore, it is often advocated that sensing should be performed in a cooperative manner involving a plurality of sensors.

Current research has been mainly focused on providing methods for detecting spectrum opportunities using cooperative sensing. Very little, however, has been done on how to select the sensors that will participate in the cooperative sensing. The concept of "distance spread" is treated in S. M. Mishra, A. Sahai, R. W. Brodersen, "Cooperative Sensing among Cognitive Radios", IEEE Intl. Conf. on Communication, Vol. 4, June 2006 pp. 1658-1663. Here, sensing performance with respect to the number of sensors involved in cooperative sensing and the distance between the farthest sensors on a straight line is treated. The article shows that once a certain number of sensors are participating in the cooperative sensing, adding more sensors only improves the sensing performance marginally. A drawback, however, is that the geometry is mainly limited to a straight line.

A sensor performing spectrum sensing will of course deplete overall system resources. For example, the sensor will use power for its receiver and baseband circuitry and may thus reduce a battery life-time, and the sensing process will consume processing capacity. Also, a sensor normally needs to report its sensing result somehow, which requires additional communication resources. It is therefore desirable to use as few sensors as possible in the sensing, while still having a sufficient number for the sensing to be reliable. In this sense, the number of sensors to use is a trade-off between having a high reliability of the sensing and having a low or reasonable demand on resources, such as battery capacity, of the partaking sensors and transmission overhead in the communication system. Consequently, there exists a need to be able to select the sensors that participate in the cooperative sensing in an "optimal" manner which suitably balances these conflicting aspects.

One object of the present invention is therefore to overcome or at least mitigate at least one of the above-indicated difficulties.

SUMMARY

According one aspect of the invention, the above-stated object is achieved with a method for a device, where the device first receives an invitation to participate in cooperative spectrum sensing. The device performs an autonomous decision on whether or not to participate in the cooperative spectrum sensing in response to the invitation. The decision is autonomous in the sense that it is not mandatory for the device to participate in the cooperative spectrum sensing to which the invitation relates. The device can thus decide to participate or it can decide not to participate. If, however, it is determined to participate in the cooperative spectrum sensing to which the invitation relates, spectrum sensing is then performed.

According to another aspect of the present invention, the above-stated object is achieved with a device for performing the above method. In particular, the device may comprise a communication unit for receiving the invitation to participate in cooperative spectrum sensing and a decision unit configured to take the autonomous decision on whether or not to participate in the cooperative spectrum sensing.

With the above-indicated approach, sensor selection becomes "distributed", i.e. it is up to the device itself to decide on participation in the cooperative sensing, rather than having, for example, a central entity determining what devices should act as sensors in the cooperative spectrum sensing. One advantage is that the amount of signalling required for sensor selection can be kept at a minimum, thereby saving communication resources. If, instead, a central decision on sensor participation was to be made, an additional inquiry to find candidate devices for the cooperative spectrum sensing would have to be performed, and this inquiry would, of course, require additional signalling between the central entity and potential sensor devices.

Furthermore, in particular embodiments, the autonomous decision may be made dependent on various forms of information, which may include information that is specific for the device in question. For example, such information may comprise any one of the following: information regarding battery status; information regarding previous participation in cooperative sensing; information regarding nearby sensors; information on a total number of entities that have been invited to participate in the cooperative spectrum sensing; and information on a desired number of entities to participate in the cooperative spectrum sensing. An advantage with such embodiments is that the device can decide to participate in the cooperative spectrum sensing only when conditions are favourable for that particular device. For example, in situations when participation in cooperative spectrum sensing would put an undue burden on the device in terms of resources, e.g. battery capacity, the device can decide not to participate. In such embodiments, the cooperative sensing will be performed in an advantageous manner in the sense that system resources will only be taken into account for the cooperative spectrum sensing where this is most convenient, thereby achieving a more optimal use of overall system resources.

Moreover, in particular embodiments, the device can make the autonomous decision on whether or not to participate in cooperative sensing in a probabilistic manner. That is, the device determines based on a random procedure whether or not to participate in the cooperative sensing. An advantage with this approach is that it provides a particularly efficient way of balancing between the desire to obtain a sufficient number of sensors for participation in cooperative sensing and the desire to limit the overall strain on system resources caused by the cooperative sensing. If, by contrast, participation is determined purely on deterministic criteria, it may happen that many sensors currently are low on resources and therefore decide not to participate in sensing. The result could be that too few sensors take part in the cooperative sensing, which therefore becomes unreliable. On the other hand, if many sensors currently are high on resources, it may happen that an unnecessarily large number of sensors participate in the sensing, which therefore deplete overall system resources more than what is necessary in order to provide reliable sensing. With the probabilistic approach these two extreme situations can largely be avoided. Conditions that are specific for each device may still be accounted for by making the random procedure dependent on such conditions.

The invention will now be described further using exemplary embodiments and referring to the drawings. A person skilled in the art will appreciate that further objects and advantages may be associated with these exemplary embodiments of the invention.

BRIEF DESCRIPTION OF THE DRAWINGS

FIG. 11 is a table summarising some examples of probability function selection according to embodiments of the invention.

DETAILED DESCRIPTION

Figure 1:
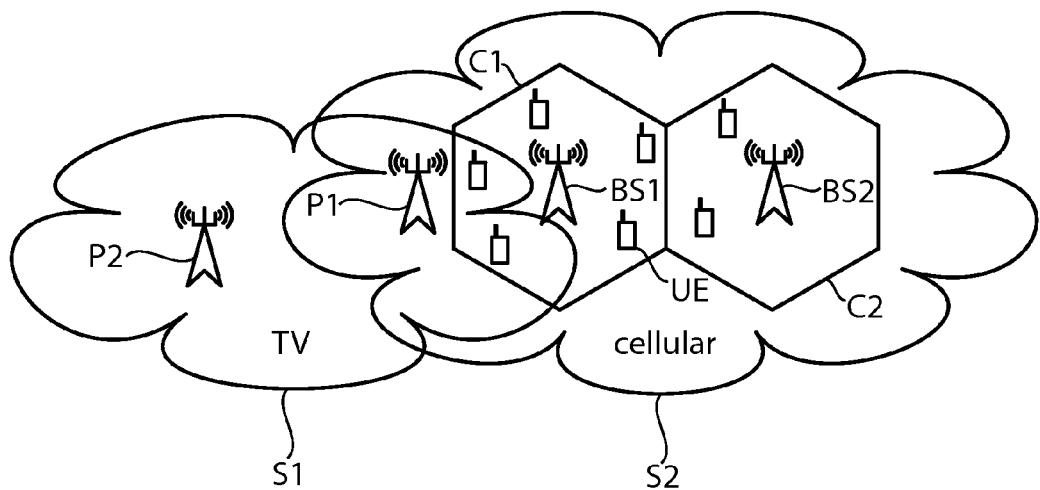
FIG. 1 is schematic network diagram illustrating an exemplary spectrum-on-demand situation where embodiments of the invention may be applied.

FIG. 1 is schematic network diagram illustrating one, purely exemplary, spectrum-on-demand situation where embodiments of the present invention may be applied. In the figure, there are two radio communication systems S1 and S2 with intersecting coverage areas. Here, by way of example, the system S1 is a television broadcasting system, symbolically represented by two broadcasting antennas P1 and P2, and the system S2 is a cellular radio communication system, symbolically represented by two base stations BS1 and BS2, which provide radio coverage in cells C1 and C2, respectively. A number of user equipments (UE) serviced by the system S2 are also shown. The system S1 has a license for a spectrum band B1. However, the system S2, which has a license to another spectrum band B2, also wants to be able to exploit spectrum opportunities in the spectrum band B1. Consequently, the system S2 thus has a reliable spectrum band B2 in which it can schedule all control signalling as well as data and other forms of communications. At the same time, if required or desired, it has the option to temporarily extend its available spectrum by using the more unreliable spectrum band B1 as a secondary user. As long as a system load in the system S2 is low relative to the bandwidth of the spectrum band B2, it is probably not necessary for the system S2 to use resources in the spectrum band B1. However, when the system load becomes high, the spectrum band B1 can be used by the system S2, e.g. for non time-critical transmissions, such as large file transfers and the like. Therefore, the system S2 needs to develop an awareness of the spectrum opportunities existing in the spectrum band B1, that is, radio resources (e.g. time/frequency resources or codes) in the spectrum band B1 which are currently not used by the system S1, or by any other system operating as secondary user in the spectrum band B1. Here, however, it is assumed that the system S1 does not directly supply the system S2 with information on spectrum opportunities in the spectrum band B1. The system S2 therefore has to detect the opportunities itself by sensing. If the system S2 is confident that there are resources in the spectrum band B1 which are not being used, the system S2 may choose to use those resources for its own traffic.

Figure 2:
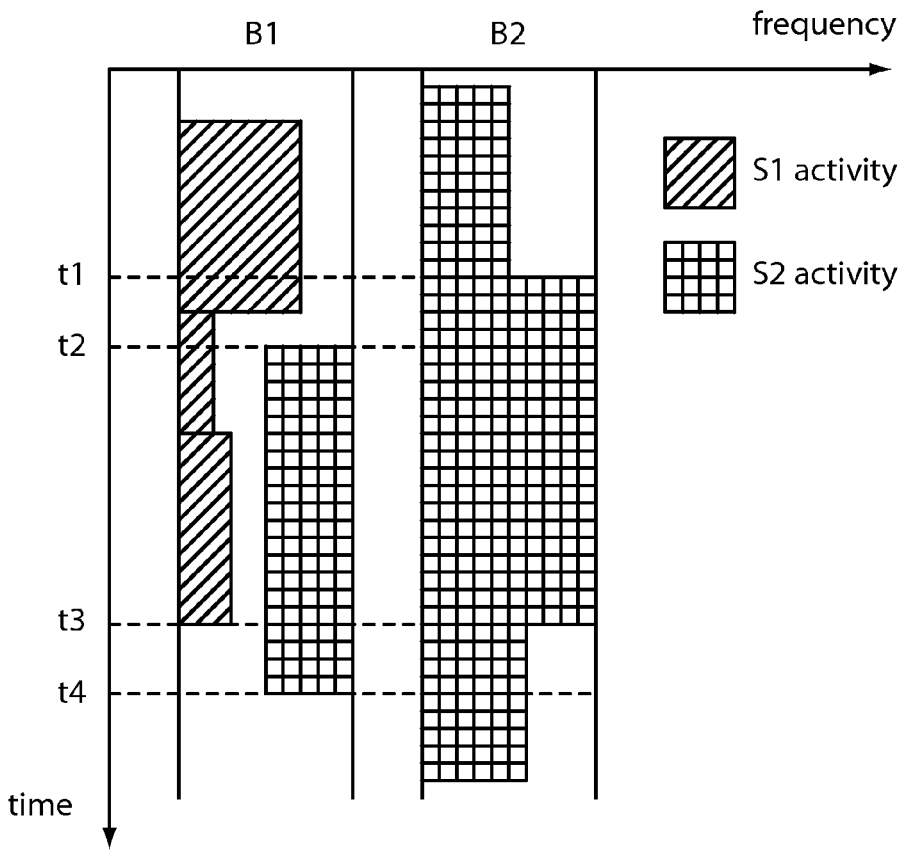
FIG. 2 is frequency-time diagram illustrating spectrum-on-demand operation in the network situation illustrated in FIG. 1.

FIG. 2 is a frequency-time diagram that provides an example of spectrum-on-demand operation applied to the network situation of FIG. 1. At a time t1, the system S2 experiences an increased spectrum demand when its licensed spectrum band B1 becomes fully utilized. The system S2 starts to sense the band B1 in search for spectrum opportunities. At a time t2, system S2 has detected a spectrum opportunity and starts to use part of the spectrum band B1 in a secondary manner. At a time t3, the spectrum demand in the system S2 decreases but S2 still utilizes resources in B1. At a time t4, the spectrum demand decreases further and the system S2 abandons the spectrum band B1.

The sensing in the system S2 is preferably performed in a cooperative manner involving a plurality of sensors, in order to improve reliability. The nodes of the system S2, such as base stations and/or serviced user equipments, may act sensors.

Figure 3:
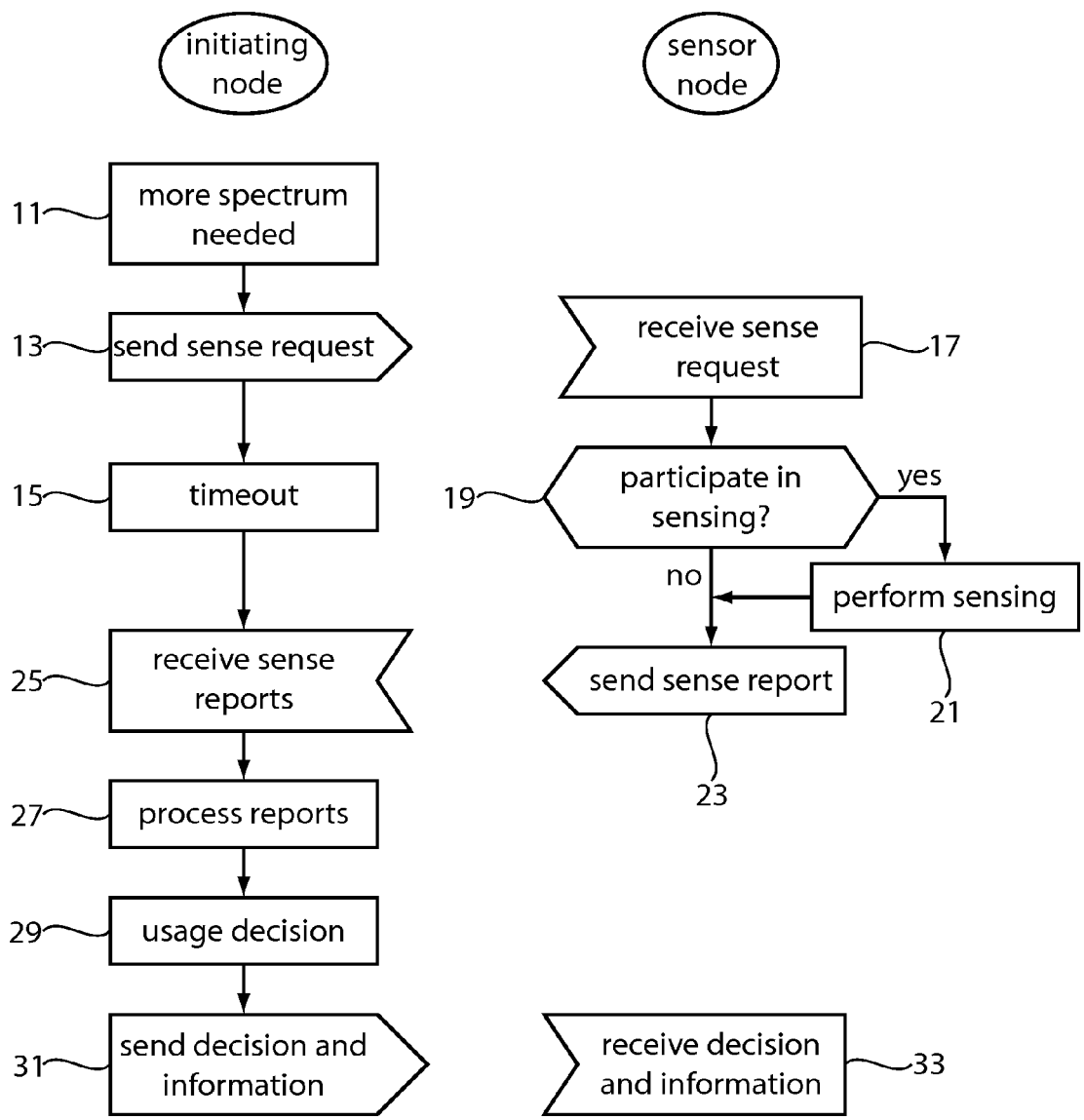
FIG. 3 is flow chart illustrating cooperative spectrum sensing operation according to an embodiment of the invention.

FIG. 3 is a flow chart that illustrates one example of cooperative sensing in accordance with an embodiment of the invention. The left side of FIG. 3 illustrates actions performed by an initiating node, which in the situation illustrated FIG. 1 could be, for example, one of the base stations BS1 or BS2. However, in general, the initiating node can be any type of node and it can also be capable of acting as sensor. The right side of FIG. 3 illustrates actions performed by another node, which is acting as a sensor (e.g. a user equipment or a base station in the example of FIG. 1). At a block 11, the initiating node has reached a decision that more spectrum is needed and therefore sends a sense request inviting a plurality of sensors to take part in cooperative sensing at block 13. The sense request may reach a sensor node via a direct path, but may also reach the sensor via one or more intermediate nodes. The sense request may specify the spectrum resources to which the cooperative sensing should be applied. At a block 17 the sense request is received by one of the nodes acting as a sensor. In response to receiving the sense request, the sensor node takes a decision on whether or not to participate in the cooperative sensing at a block 19. If the sensor node determines to participate in the cooperative sensing, sensing is performed at a block 21. During sensing, the sensor node listens to applicable spectrum resources, which may have been specified in the sense request, to detect whether these resources are occupied or if they appear to be free for secondary use. After the sensing has been performed, the sensor node summarises an outcome of the sensing in a sense report that is sent to the initiating node at a block 23. In this particular example, a sense report is sent to the initiating node also when the sensor node has not participated in the cooperative sensing, e.g. in order to make the initiating node explicitly aware of the fact the sensor node has not participated in the cooperative sensing. However, this is purely optional. During a specified time interval, the initiating node receives sense reports from the sensors that have been invited to participate in the cooperative sensing at a block 25. The received reports are processed by the initiating node at a block 27. The processing of the sense reports results in a usage decision at a block 29. The usage decision establishes whether or not one or more spectrum opportunities have been detected as a result of the cooperative sensing. At a block 31, the initiating node sends the usage decision and possibly additional information to relevant nodes of the system. Here, the sensor node receives this transmission at block 33.

Consequently, in the embodiment of FIG. 3, the sensors are not required to participate in the cooperative sensing but are allowed to take an autonomous decision on whether or not to participate in the cooperative sensing. In this sense, the selection of the sensors that participate in cooperative sensing is performed in a distributed manner. Each sensor may base it decision on one or more parameters and/or variables, which may take into account one or more conditions and/or capabilities which are specific to the sensor in question, such as an available battery capacity of the sensor, a processing capability of the sensor etc. By allowing the sensors to determine autonomously whether or not to participate in the cooperative sensing, a sensor may avoid participation if its current resource situation is so low (e.g. low remaining battery power or high processing demands) that participation in cooperative sensing would introduce an undue strain on the sensor's current resources. One advantage of this "distributed" approach to sensor selection is that the amount of signalling required for sensor selection can be kept at a minimum, thereby saving communication resources. If, instead, a central decision on sensor participation was to be made, an additional inquiry to find candidate devices for the cooperative spectrum sensing would have to be performed, and this inquiry would, of course, require additional signalling between the central entity and potential sensor devices.

In particular embodiments, the step 19 may include a check to determine if the node that receives the sense request has the capabilities to perform sensing. This is particularly useful when so-called SDR (Software Defined Radio) is employed. SDR means that a piece of radio equipment can alter much of its radio operation, such as operating parameters of frequency range, modulation type or maximum output power et cetera, by making changes in the software without making any changes to hardware components. In such a situation, it is clear that sensing capability can be solely a question of having the appropriate software available. It thus makes sense to check for recent software upgrades which may provide sensing capabilities which previously did not exist.

In particular embodiments, the sensor can make its decision on whether or not to participate in cooperative sensing in a probabilistic manner. That is, the sensor determines based on a random procedure whether or not to participate in cooperative sensing. The random procedure is preferably such that the sensor will participate with a certain given probability, hereinafter referred to as the participation probability (P). The participation probability P may in each case be based on one or more parameters and/or variables. In exemplary embodiments, the participation probability P may be determined by calculating a defined mathematical function, hereinafter referred to as the probability function (f). The participation probability P is then obtained as P=f(list), where the "list" is just used as typographic way saying that the probability function f is a function of a list of one or more parameters. The list may, for example, include one or more of the following parameters: remaining battery capacity, information relating to previous participation in cooperative sensing, information regarding nearby sensors, information on the total number of sensors that is available for cooperative sensing etc. For example, the probability function f may be defined as a function of the total number of entities that have been invited to the cooperative sensing $N_{tot}$ and a remaining battery capacity $B_r$ of the sensor, e.g. as $$f(N_{tot}, B_r) = \min\left(1, \frac{60}{N_{tot}}(1 - e^{-\frac{B_r}{B_{max}}})\right).$$

Here $B_{max}$ is a maximum battery capacity of the sensor. The value $N_{tot}$ may, for example, be delivered to the sensor from an initiating node as part of, or in connection with, a sense request. In particular, it can be noted that in this example the probability function f increases with increasing remaining battery power $B_r$ and decreases with an increasing number of available sensors, $N_{tot}$.

Figure 4:
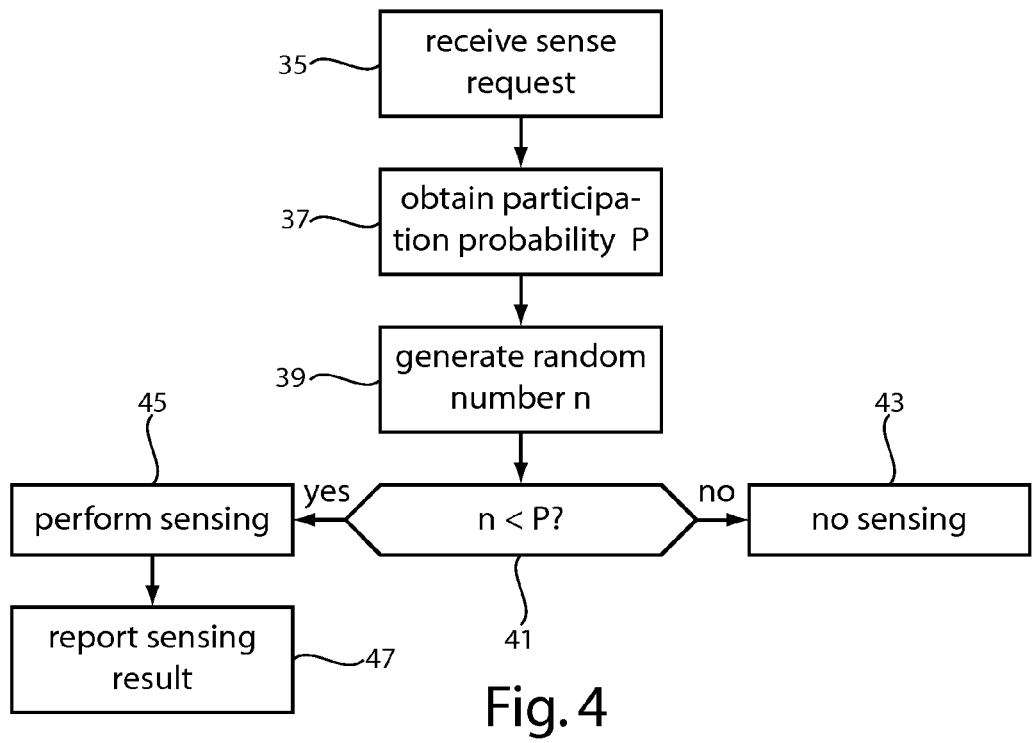
FIG. 4 is a flow chart illustrating a probabilistic determination of participation in cooperative spectrum sensing according to an embodiment of the invention.

FIG. 4 is a flow chart illustrating a method for a probabilistic determination of sensor participation in cooperative sensing according to an exemplary embodiment of the invention. At a block 35, the sensor receives a sense request inviting the sensor to participate in cooperative sensing. Then, at a block 37, the sensor obtains the participation probability P, e.g. by evaluating a predetermined probability function f, as explained above. The sensor then performs a random procedure for determining whether or not to participate in the sensing. The random procedure is devised such that the sensor will participate with a probability that equals the obtained participation probability P. Here, the random procedure includes two steps. First, at a block 39, a random number n is generated—in this particular embodiment, it is assumed that the random number n is generated in accordance with a uniform probability distribution over the interval [0,1]. Second, at a block 41, the generated random number n is compared to the obtained participation probability P in order to determine whether or not the sensor should participate in the cooperative sensing. In this particular embodiment, this means checking whether generated random number n is less than the participation probability P. As is well understood by a person skilled in the art, the probability that this condition is fulfilled is exactly equal to the obtained participation probability P. Consequently, if the random number n is less than the participation probability P, it is determined that the sensor should participate in sensing, which is then performed at a block 45. Otherwise, no sensing is performed, as indicated by a block 43. A result of any performed sensing is reported, for example, to an initiating node at a block 47. Note that, in this example, no sense report is constructed if the node decides not to participate in the cooperative sensing.

The probabilistic determination on participation in cooperative sensing has the advantage that it provides a way of balancing between the desire to obtain a sufficient number of sensors for participation in cooperative sensing and the desire to limit the overall strain on system resources caused by the cooperative sensing. If participation is determined purely on deterministic criteria, it may happen that many sensors currently are low on resources (e.g. low remaining battery power) and therefore decide not to participate in sensing. The result is that too few sensors take part in the cooperative sensing, which therefore becomes unreliable. On the other hand, if many sensors currently are high on resources, it may happen that an unnecessarily large number of sensors participate in the sensing, which therefore deplete overall system resources more than what is necessary in order to provide reliable sensing. With the probabilistic approach these two extreme situations can largely be avoided. Conditions that are specific for each sensor can still be accounted for by making the participation probability P for the sensor in question dependent on such conditions.

Figure 5:
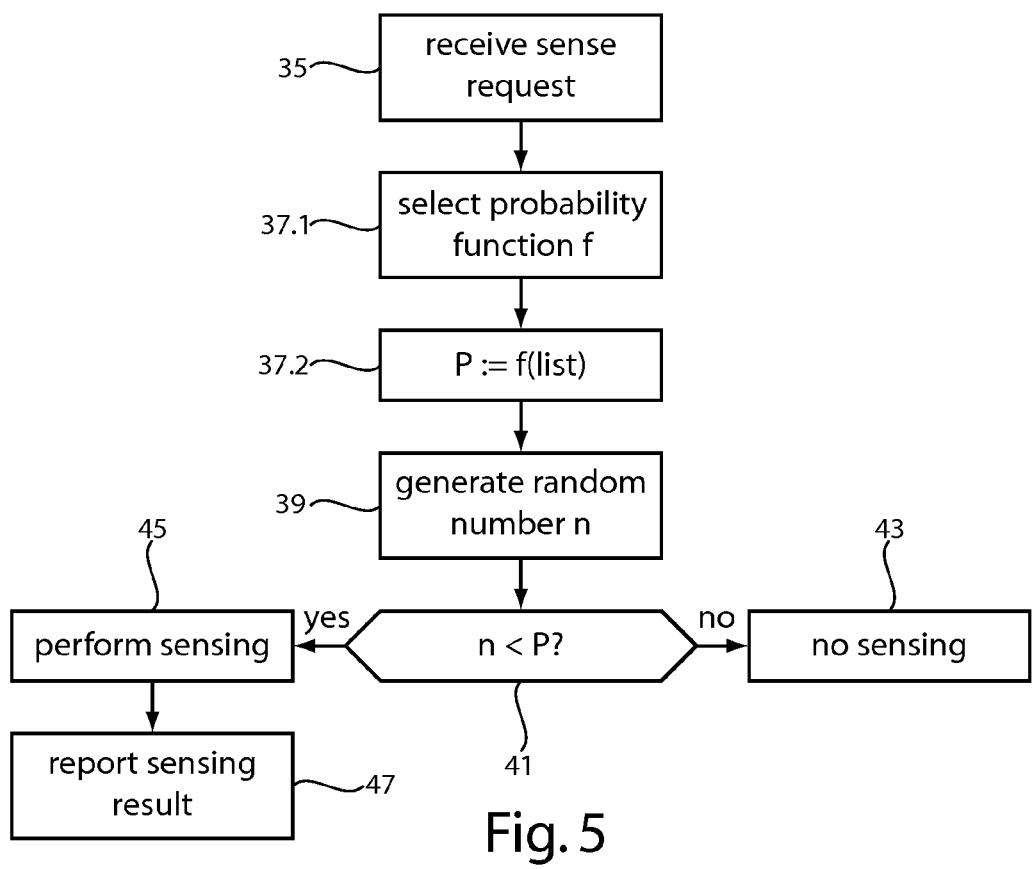
FIG. 5 is a flow chart illustrating a probabilistic determination of participation in cooperative spectrum sensing according to an embodiment of the invention.

FIG. 5 is flow chart that illustrates a method for a probabilistic determination of sensor participation in cooperative sensing according to another exemplary embodiment of the invention. The method of FIG. 5 includes several steps that are the same as steps in the method of FIG. 4. These steps have been given the same reference numerals as in FIG. 4 and will not be discussed in detail again. In the method of FIG. 5, there is not only one possible probability function, and the method therefore comprises an act, at a block 37.1, of selecting the probability function f which is to be used. The participation probability P is then obtained by evaluation of the selected probability function f at a block 37.2.

Some practical, but non-limiting, examples on how to select the probability function f will now be presented. For the convenience of the reader, some of these examples are summarised in a table of FIG. 11.

In particular embodiments, the probability function to be used may be selected from a predetermined collection of functions. The functions in the collection need not have the same domain. The collection may comprise a finite number of functions, but may in principle also comprise an infinite number of functions (an example of this will be given later).

The selection of the probability function to use may, for example, be based on information provided by an initiating node. One embodiment of this is to let the initiating node attach a need parameter np to, for example, a sense request. The need parameter np indicates whether more or fewer sensors are needed compared to a previous cooperative sensing occasion. The sensor can then base its selection of probability function on the information provided by the need parameter np or, as another example, np may be a parameter in one or several probability functions f. If more sensors are needed, the sensor may select a probability function which in general produces higher values of the participation probability P compared to a previously used probability function. If, on the other hand, fewer sensors are needed, the sensor may instead select a probability function which in general produces lower values of the participation probability P compared to the previously used probability function. For example, np>1 may indicate that more sensors are needed to participate than the number of sensors that did participate in the previous occasion, or previous occasions, of cooperative sensing, and np<1 may indicate that fewer sensors than before are needed for the sensing. The need parameter np may also be used to more specifically indicate a desired number of participating sensors, e.g. the desired number of participating sensors may be equal to the need parameter np times the number of sensors that did participate in the previous cooperative sensing occasion, and a sensor that receives the need parameter may select the probability function in accordance with this information.

In another embodiment, different predefined sensing participation probability functions are defined for the sensors, and e.g. an initiating node may specify, for example, in a sense request which predefined function should be used in a forthcoming autonomous participation decision. A special case of a predefined participation probability function is a function which is equal to one (1) on the whole of its domain, so that when this participation probability function is specified, the sensor must always participate in the cooperative sensing. In practice, this means that the sense request, at least temporarily, is changed from an invitation to participate to an order to participate.

Moreover, in order to reach a more fair distribution of sensing over the available sensors, a sensor may base its selection of the probability function on its previous involvement in cooperative sensing. That is, a sensor that has frequently participated in cooperative sensing may a select a probability function that in general produces relatively low values for the participation probability P.

To account for the possibility that the initiating node may have a desired number of sensors to take part in the cooperative sensing, $N_{target}$, the probability function f may be selected based on this value. In a particular embodiment, the probability function could be selected such that $$<N> = N_{target},$$

where $<N>$ is the expected value for the number of sensors N that participate in the cooperative sensing (from here on, $<\cdot>$ will be used to denote the expectation operator), i.e. N is here seen as a random variable. Below, a simple non-limiting example is given which illustrates how the function f can be selected to fulfill the above-stated constraint. By way of example, the possible functions under consideration will be functions of a battery level b, i.e. the ratio between remaining battery capacity and maximum battery capacity ($b=B_r/B_{max}$)—this conveniently makes dom(f)=[0,1] in this particular example. The expected value $<N>$ may be written as $$<N> = <\sum_{i=1}^{N_{tot}} a_i> = \sum_{i=1}^{N_{tot}} <a_i> = N_{tot}<a> = N_{target} \quad (1)$$

where each $a_i$ is a binary random variable which illustrates participation of sensor i in sensing (i.e. $a_i=1$ if sensor i is taking part in the sensing, otherwise $a_i=0$). $N_{tot}$ is the total number of sensors that are invited to participate in the sensing. Here, $<a_i>=<a>$ is used, because the same information is assumed available about each sensor, so the value of the index i will not matter in this particular example (i.e., there is no information indicating that any sensor should have a higher participation probability $<a_i>$ than the rest). Hence, the index i is excluded in the following. From the definition of the expectation operator $<\cdot>$ follows:

$$<a> = 1 \cdot Pr(a=1) + 0 \cdot Pr(a=0) = Pr(a=1), \quad (2)$$

where $Pr(\cdot)$ stands for "probability". By the laws of probability theory $$Pr(a=1) = \int_0^1 Pr(a=1, b)db = \int_0^1 Pr(a=1 \mid b)p(b)db, \quad (3)$$

where a marginalization over the battery level b (which varies between 0 and 1) is performed in the first equality, and the product law of probability theory is used in the second equality –p(b) is a (known) probability density function associated with the battery level b. Note, that $Pr(a=1|b)$ describes the probability of a sensor being active in sensing, conditioned on the battery level b, which is precisely what the probability function f is intended to provide. Thus, by definition, $Pr(a=1|b)=f(b)$. A combination of (1), (2) and (3) results in $$\int_0^1 f(b)p(b)db = \frac{N_{target}}{N_{tot}}. \quad (4)$$

Thus, in equation (4), the constraint on $<N>$ has been translated into a functional constraint on the selected probability function f. In plain language, equation (4) states that the probability function f should be selected such that the associated participation probability P on average equals the ratio $N_{target}/N_{tot}$. To obtain dependencies on other parameters than the battery level, one can of course use a similar methodology as outlined above. That is, equation (4) is not limited to the battery level b but can in principle be used with any other variable v. However, the function domain associated with the variable v may different from the domain associated with the battery level b. If so, the integration in (4) should of course be performed over the relevant function domain associated with the variable v. Moreover, equation (4) can easily be extended to a multivariable case according to $$\int_{dom(f)} f(v_1, \ldots, v_K)p(v_1, \ldots, v_K)dv_1 \ldots dv_K = \frac{N_{target}}{N_{tot}}, \quad (4.1)$$

where $v_1, \ldots, v_K$ are used to denote the variables of the probability function f and $p(v_1, \ldots, v_K)$ is the multivariable probability density associated with these variables.

To make things even more concrete, the functions under consideration will now be based on a simple affine function $b \mapsto \alpha b+\beta$, taking due account of the additional restrictions provided by function domain and codomain (both being the interval [0,1] in this example). Therefore, the functions under consideration will be of the following simple form ($0 \leq b \leq 1$)

$$f(b) = \begin{cases} \alpha b + \beta & \text{when } 0 \leq \alpha b + \beta \leq 1 \\ 0 & \text{when } \alpha b + \beta < 0 \\ 1 & \text{when } 1 < \alpha b + \beta \end{cases}.$$

Note that the above-stated equation actually defines a collection of functions, i.e. one function for each choice of the constants $\alpha$ and $\beta$. To avoid trivial cases, it can be assumed that min $(0,-\alpha) < \beta <$ min $(1,1-\alpha)$. The idea is now to select $\alpha$ and $\beta$ such that the constraint ($<N> = N_{target}$) is fulfilled. This gives two degrees of freedom ($\alpha$ and $\beta$) for one constraint. In this example, purely for purpose of illustration, it is therefore assumed that a fixed positive value of $\alpha$ is given, and then a value of $\beta$ is found that satisfies the constraint.

Furthermore, assume a uniform probability density for the battery level b, i.e. $p(b)=1$, $0 \leq b \leq 1$. Under the above assumptions, (4) becomes $$\int_0^1 f(b)p(b)db =$$

$$\int_{b_1}^{b_u} (\alpha b + \beta)db + \int_{b_u}^1 1 db = \frac{\alpha(b_u^2 - b_1^2)}{2} + \beta(b_u - b_1) + 1 - b_u = \frac{N_{target}}{N_{tot}}$$

Here, $$b_1 = \max\left(-\frac{\beta}{\alpha}, 0\right) \text{ and } b_u = \min\left(\frac{1-\beta}{\alpha}, 1\right).$$

Figure 6:
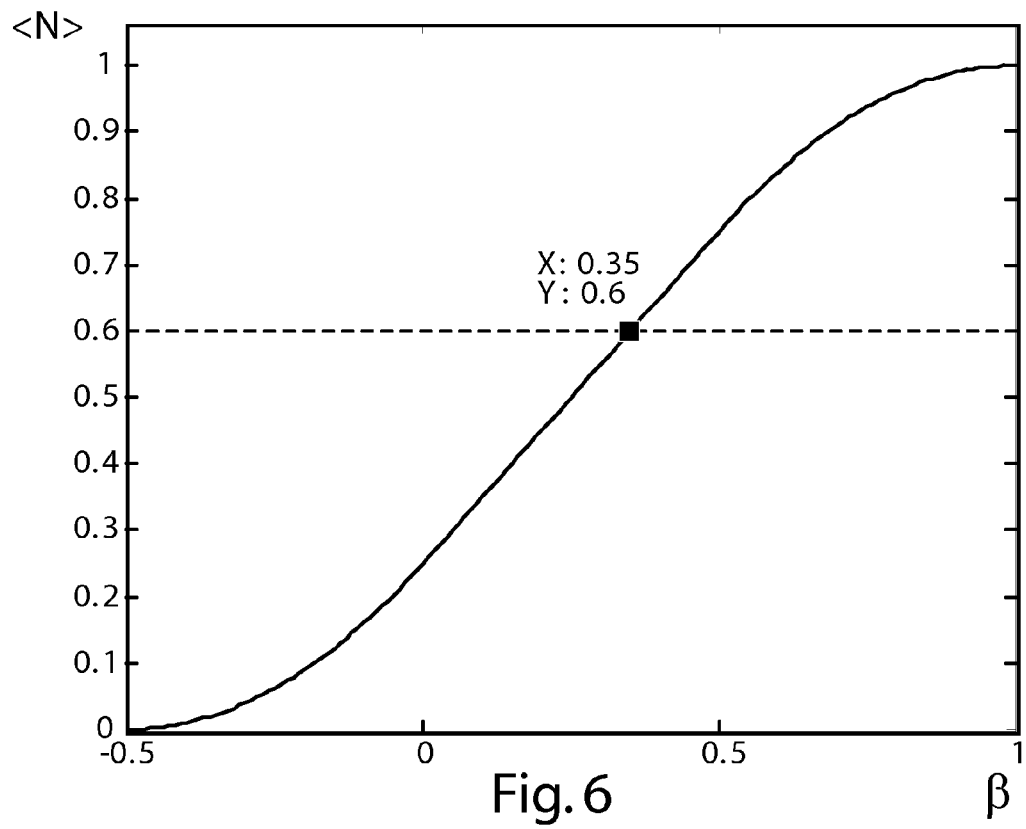
FIG. 6 is a diagram illustrating selection of a particular probability function according to an embodiment of the invention.

Now, assume that the value of $\alpha$ is fixed to 0.5. Then, a plot of the expression $$\frac{\alpha(b_u^2 - b_1^2)}{2} + \beta(b_u - b_1) + 1 - b_u$$

for various values of $\beta$ can be generated. Remember, however, that $b_l$ and $b_u$ both depend on $\beta$. Such a plot is shown in FIG. 6. Assuming $N_{target}/N_{tot}=0.6$, the appropriate $\beta$-value can be found in the plot to be 0.35. Hence, $b_l=\max(0, -0.35/0.5)=0$ and $b_u=\min(1, (1-0.35)/0.5)=1$, so $f(b)=0.5b+0.35$ (for any b in the domain [0, 1]) gives the requested $<N> = 0.6$.

Another way of selecting the probability function $f(b)$, for the case of the uniform battery level probability density function $p(b)$, is given by $$f(b) = -4 \frac{N_{target}}{N_{tot}} b^2 \left(b - \frac{3}{2}\right),$$

which is a valid function when $$N_{target} \leq \frac{1}{2} N_{tot}.$$

It can easily be verified that this function satisfies (4) if p(b) is chosen to be uniform. The advantage of this function, compared to the affine example presented above, is that it always gives a very low probability for participation to the sensors with low battery levels.

Figure 7:
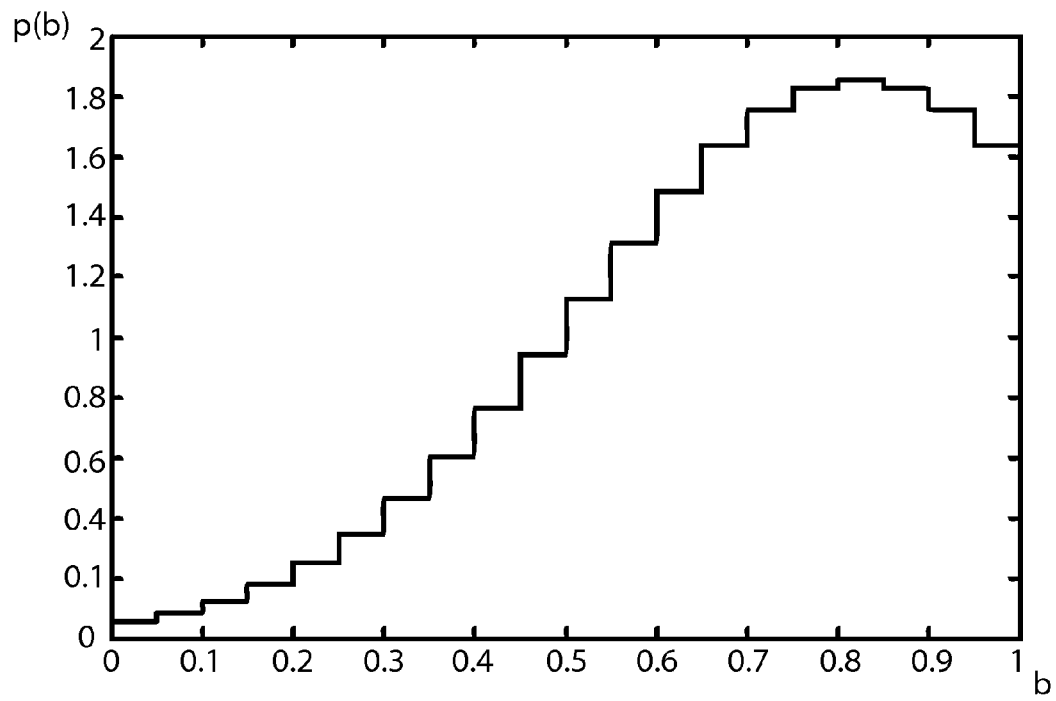
FIG. 7 is diagram illustrating an exemplary probability density function.

It is of course not necessary to assume a uniform probability density $p(b)$ when selecting the probability function $f(b)$ based on (4), as will bee seen by the following example. The domain interval [0,1] is partitioned into a number (M) of subintervals $I_1=[0,1/M]$, $I_2=]1/M, 2/M]$, ..., $I_M=] (M-1)/M, 1]$. The probability density $p(b)$ is assumed to be constant on each subinterval, but may of course assume different values on different subintervals. FIG. 7 illustrates an example where $p(b)$ is truncated normalized Gaussian. In a corresponding manner, the probability function $f(b)$ is assumed to be constant on each subinterval. The probability function $f(b)$ is now determined by an iterative process, starting with the last subinterval $I_M$ and considering the contribution to the integral in (4) from this subinterval, the contribution being $$\frac{1}{M} f(I_M) p(I_M), \quad (5)$$

where $f(I_M)$ and $p(I_M)$ are the constant values on the subinterval $I_M$ of the probability function $f(b)$ and the probability density $p(b)$, respectively. Define a maximum value for the probability function f, $f_{max}$, (i.e., a user parameter) which ensures that no sensors are forced to participate. If the integral contribution, with $f(I_M)=f_{max}$, is not greater than the target value for the integral, i.e. $N_{target}/N_{tot}$, $f(I_M)$ is set to $f_{max}$, otherwise $f(I_M)$ is set according to $$f(I_M) = \left(\frac{1}{M} p(I_M)\right)^{-1} \frac{N_{target}}{N_{tot}} \quad (6)$$

and the process terminates. Assuming that the process for determining the probability function $f(b)$ has not terminated, the process continues with the next subinterval $I_{M-1}$ in corresponding manner. First, try to assign the value $f_{max}$ to $f(I_{M-1})$. If the integral contribution on subinterval $I_{M-1}$, calculated in a similar manner as in (5), does not contribute too much to the integral, then $f(I_{M-1})$ is set to $f_{max}$, and the process continues to the interval number M-2. If the target value of the integral is exceeded, then the value of $f(I_{M-1})$ is calculated in a similar way as in (6) and the process terminates. For the convenience of the reader, the above-described process for iteratively determining $f(b)$ is also summarised below with a simple pseudo program code.

```
m := M;
int := 0;
for k = 1 to M do f(I_k) := 0;
ratio := N_target / N_tot;
repeat
    if int + (1/M) f_max p(I_m) =< ratio then
        f(I_m) := f_max
    else
        f(I_m) := (1/M p(I_m))^-1 (ratio - int);
```

Figure 8:
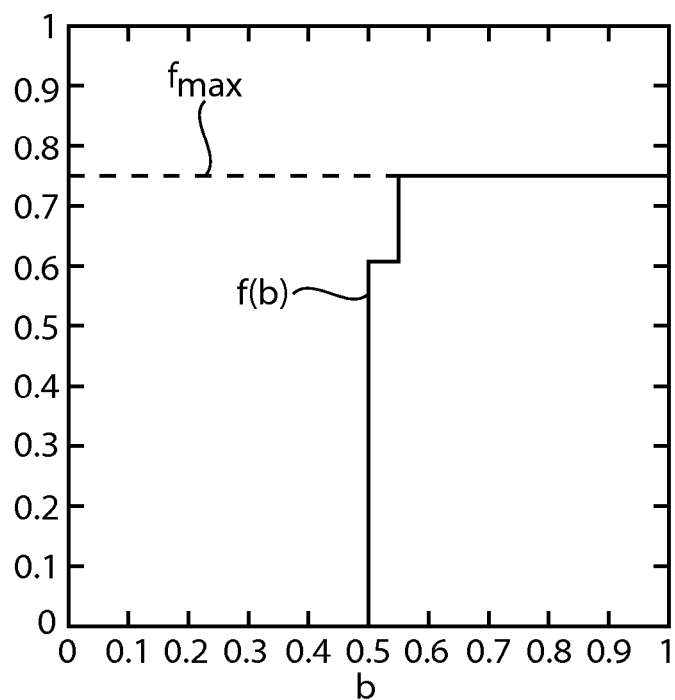
FIG. 8 is a function diagram illustrating an iteratively generated probability function according to an embodiment of the invention.

-continued $$\text{int} := \text{int} + \frac{1}{M} f(I_m) p(I_m);$$
$$m := m - 1;$$
until int = ratio or m = 0;

FIG. 8 is a diagram illustrating a probability function f(b) that has been determined by this iterative process based on the probability density p(b) of FIG. 7. By starting from the right hand side of the interval and working leftwards, the above process will assign high probabilities of participation to the sensors with high battery levels, and low or no probability of participation for sensors with low battery levels, which may be a fairness issue in some applications.

The constraint ($<N>=N_{target}$) used above guarantees that the statistically expected number of participants in the cooperative sensing equals the desired number of participants. However, this does not guarantee that in any particular occasion of cooperative sensing the actual number of participants does not deviate from the desired number of participants. If a variance of N (Var(N)) is large, the deviation can be substantial. More sophisticated constraints can, however, be applied. For example $$Pr(N \geq N_{target}) = P_{OK} \tag{C1}$$

$$Pr(N \geq N_{target}) \geq P_{OK} \tag{C2}$$

Here, $P_{OK}$ is a predefined probability threshold value, which indicates an acceptable probability for the number of participating sensors to at least meet the desired number of participating sensors ($N_{target}$). Or put differently, $1-P_{OK}$ is the probability by which it can be accepted that the number of participating sensors does not meet the desired number of participating sensors. $P_{OK}$ is preferably set fairly close to one, e.g. around 0.95. The above types of constraints offer more robustness than the previously discussed type, i.e., (1). However, the computational complexity also increases somewhat. Using standard probability models, it can be shown that $$Pr(N \geq N_{target}) = \sum_{i=N_{target}}^{N_{tot}} \binom{N_{tot}}{i} (Pr(a=1))^i (1 - Pr(a=1))^{N_{tot}-i} \tag{7}$$

where, as before, $N_{tot}$ is the total number of sensors that are invited to participate in the sensing. Application again of (3) and using the above-mentioned fact that Pr (a=1|b)=f(b) results in $$Pr(a=1) = \int_0^1 Pr(a=1 \mid b) p(b) db = \int_0^1 f(b) p(b) db. \tag{3.1}$$

A process for selecting the probability function f(b) based on any one of the constraints (C1) or (C2) can now, by way of example, be as follows. Using (7), solve the constraint for the quantity Pr(a=1). A numerical solution may, for example, be applied here. Having established a value of Pr(a=1), (3.1) provides a functional constraint for the probability function f(b)—this functional constraint is similar to (4), with the only difference that $N_{target}/N_{tot}$ has been replaced with Pr(a=1). Consequently, any one of the above-described ways of selecting the probability function f(b) based on (4) can now be applied, mutatis mutandis, using instead the functional constraint $$\int_0^1 f(b) p(b) db = Pr(a=1). \tag{4.2}$$

As before, this constraint can also be applied when the probability function is a function any other variable v, with the integration performed over the relevant function domain associated with the variable v. The constraint can also be extended to a multivariable counterpart, similar to (4.1).

Figure 9:
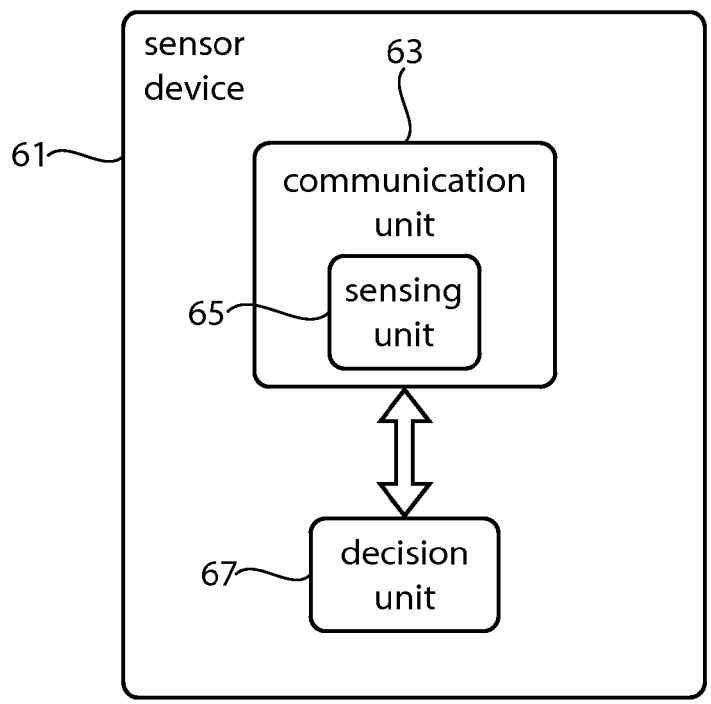
FIG. 9 is a block diagram illustrating a sensor device according to an embodiment of the invention.

FIG. 9 is a block diagram illustrating a sensor device 61 according to an embodiment of the invention. The sensor device comprises a communication unit 63, which is configured such the sensor device 61 may receive an invitation to participate in cooperative sensing. Such an invitation may, for example, be in the form of a sense request transmitted from a node or other entity that is responsible for initiating the cooperative sensing. In a particular embodiment, the communication unit 63 is configured to receive the invitation via radio communication. Alternatively, the invitation may be received in any other manner, e.g. via a fixed network connection. The sensor device further comprises a sensing unit 65 for performing sensing. In this particular embodiment, the sensing unit 65 is located within the communication unit 63. The sensor device 61 further comprises a decision unit 67, which is connected to the communication unit 63. The communication unit 63 informs the decision unit 67 of the invitation to participate in the cooperative sensing, and the decision unit 67 then takes a decision on whether or not the sensor device 61 should participate in the cooperative sensing. The decision unit 67 can take this decision in any suitable way—in particular any one of the ways to take such a decision described and indicated above may be used by the decision unit 67. If the decision unit 67 determines that the sensor device 61 should participate in the cooperative spectrum sensing, the decision unit 67 sends an order to perform sensing to the sensing unit 65, which then performs sensing. Once the sensing has been performed, the communication unit 63 may report a result of the sensing to, for example, the node or other entity that has initiated the cooperative sensing. The decision unit 67 may, for example, be implemented using any suitable circuit technology, e.g. application specific circuitry or programmable circuitry, or any combination thereof. The person skilled in the art will appreciate that the decision unit 67 may also fully or in part be implemented with one or more processor programmed with suitable software.

Figure 10:
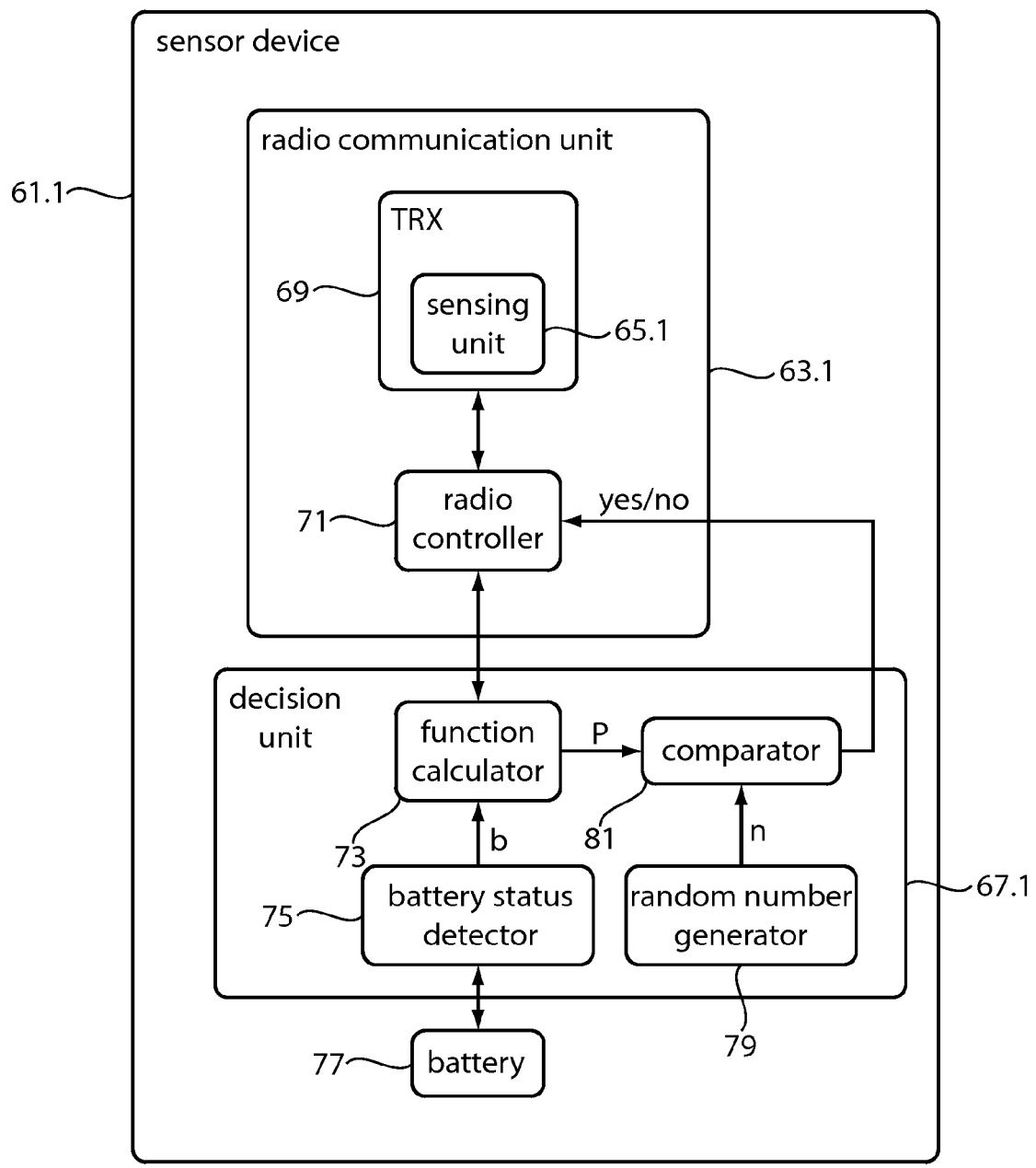
FIG. 10 is a block diagram illustrating a sensor device according to an embodiment of the invention.

FIG. 10 is block diagram illustrating a sensor device 61.1 according to another embodiment of the invention. The sensor device 61.1 of FIG. 10 is particularly adapted to make a probabilistic decision on whether or not to participate in cooperative sensing. The sensor device 61.1 comprises a radio communication unit 63.1 comprising at least one transceiver 69. The radio communication unit 63.1 further comprises a sensing unit 65.1, which in this particular embodiment is built into the transceiver 69. A radio controller 71 in the radio communication unit 63.1 is connected to the transceiver 69 and adapted to control an operation of the transceiver 69 and the sensing unit 65.1. The sensor device 61.1 also comprises a decision unit 67.1, which is adapted such that the sensor device 61.1 may, in response to an invitation, take an autonomous decision on whether or not to participate in cooperative spectrum sensing. The invitation may, for example, be received by the transceiver 69, e.g. as part of a sense request from an initiating node, and the radio controller 71 is then adapted to inform the decision unit 67.1 about the invitation to participate in cooperative spectrum sensing. The decision unit 67.1 comprises a function calculator 73, which is adapted to calculate a participation probability P by evaluating a probability function. In this particular embodiment, the probability function is function of a battery level b. The decision unit 67.1 therefore comprises a battery status detector 75, which is connected to a battery 77 of the sensor device 61.1. The battery status detector 75 is adapted to measure the battery level b associated with the battery 77. The battery status detector 75 is also connected to the function calculator 73 and adapted to inform the function calculator 73 about the measured battery level b. The decision unit further comprises a random number generator 79, which is adapted to generate a random number n. A comparator 81 comprised in the decision unit 67.1 is adapted to receive the random number n from the random number generator 79 and the participation probability P from the function calculator 73. The comparator 81 is adapted to compare the participation probability P with the random number n. Based on this comparison, the comparator 81 is adapted to determine whether or not the sensor device 61.1 is to take part in the cooperative spectrum sensing. The comparator is connected to the radio controller 71 and adapted to inform the radio controller 71 about the decision. In a particular embodiment, the random number generator 79 may be adapted to generate the random number n in accordance with a uniform probability distribution over the interval [0,1]. In such an embodiment, the comparator 81 may be adapted to check whether the random number is less than the participation probability. If so, the comparator 81 is adapted to determine that sensing is to be performed and to send a signal to the radio controller 71 indicating that sensing is to be performed. In response to this signal, the radio controller 71 is adapted to send instructions to the sensing unit to perform sensing in accordance with the received invitation. Once sensing has been performed, the radio controller 71 may be adapted to compile a report relating to the performed sensing and to instruct the transceiver 69 to transmit the compiled report to, for example, an initiating node. The various parts of the sensor device, such as the radio controller 71 and the decision unit 67.1, may, for example, be implemented using any suitable circuit technology, e.g. application specific circuitry or programmable circuitry, or any combination thereof. The person skilled in the art will appreciate that these parts may also fully or partly be implemented with one or more processors programmed with suitable software.

In alternative embodiments, the function calculator 73 may of course be configured to calculate other forms of probability functions, of one or several variables. In embodiments where several probability functions are possible, the function calculator 73 may also be configured to select the probability function to be used. In particular, the function calculator 73 may use any one of the ways described and indicated above for selecting the probability function. Alternatively, however, the selection of the probability function may performed elsewhere in the sensor device 61.1, e.g. in the radio controller 71.

If SDR is employed in the embodiments of FIGS. 9 and 10, the sensing units 65 and 65.1 do not have to be implemented as particular hardware units. Instead, the sensing units 65 and 65.1 may be a combination of standard SDR hardware and particular sensing software enabling the standard SDR hardware to perform sensing. In such a case, the decision units 67 and 67.1 may be configured to check, as part of the decision operation, whether or not the sensor devices 61 and 61.1 have the necessary software to perform sensing.

The sensor devices described and indicated above may of course form part of or constitute a system node, such as, for example, a base station or a user equipment.

Above, the invention has been illustrated with various embodiments. These embodiments are, however, intended only as non-limiting examples, and the scope of protection is instead defined by the appending claims.

The invention claimed is:

1. A method for operating a device, the method comprising:
   receiving an invitation to participate in cooperative spectrum sensing;
   in response to the invitation, determining autonomously based on a random procedure whether or not to participate in the cooperative spectrum sensing; and
   performing spectrum sensing in response to the determination to participate in the cooperative spectrum sensing,
   wherein the random procedure causes the device to have a probability of participating in cooperative spectrum sensing that is responsive to participation probability.

2. The method according to claim 1, further comprising obtaining the specified participation probability, wherein the random procedure comprises:
   generating a random number in accordance with a predetermined probability distribution;
   comparing the random number with the obtained participation probability; and
   determining whether or not to participate in the cooperative spectrum sensing based on the step of comparing.

3. The method according to claim 2, wherein:
   the predetermined probability distribution is a uniform distribution on the interval from zero to one; and
   the step of comparing involves checking whether the generated random number is less than the obtained participation probability.

4. The method according to claim 2, wherein the specified participation probability is obtained by evaluating a mathematically defined probability function.

5. The method according to claim 4, further comprising selecting the probability function.

6. The method according to claim 5, wherein the step of selecting comprises selecting the probability function from a predetermined collection of probability functions.

7. The method according to claim 5, wherein the step of selecting comprises selecting the probability function at least in part based on information from an entity that transmitted the invitation to participate in the cooperative spectrum sensing.

8. The method according to claim 5, wherein the step of selecting comprises selecting the probability function based on a need parameter that indicates a need for participation in cooperative spectrum sensing relative to one or more previous occasions of cooperative spectrum sensing.

9. The method according to claim 5, wherein the step of selecting comprises selecting the probability function based on a desired number of participants in the cooperative spectrum sensing.

10. The method according to claim 9, wherein the step of selecting comprises selecting the probability function based on a constraint requiring that a statistically expected number of participants in the cooperative spectrum sensing should equal the desired number of participants in the cooperative spectrum sensing.

11. The method according to claim 9, wherein the step of selecting comprises selecting the probability function based on a constraint requiring that a probability that a number of participants in the cooperative spectrum sensing is greater than or equal to the desired number of participants in the cooperative spectrum sensing fulfils a predetermined relationship with respect to a predetermined probability threshold value.

12. The method according to claim 1, further comprising reporting information relating to a result of having performed the cooperative spectrum sensing.

13. A device comprising:
a communication unit configured for receiving an invitation to participate in cooperative spectrum sensing;
a decision unit configured to take an autonomous decision based on a random procedure on whether or not to participate in the spectrum sensing in response to the invitation; and
a sensing unit configured to perform the cooperative spectrum sensing in response to the decision being made to participate in the cooperative spectrum sensing has been taken,
wherein the decision unit is configured to perform the random procedure to cause the device to have a probability of participating in the cooperative spectrum sensing that is responsive to a specified participation probability.

14. The device according to claim 13, wherein:
the decision unit is configured to obtain the specified participation probability; and wherein
the decision unit is configured responsive to the random procedure to:
generate a random number in accordance with a predetermined probability distribution;
compare the random number with the obtained participation probability; and
determine whether or not to participate in the cooperative spectrum sensing based on the comparison between the random number and the participation probability.

15. The device according to claim 14, wherein:
the predetermined probability distribution is a uniform distribution on the interval from zero to one; and
the decision unit is configured to check whether the generated random number is less than the obtained participation probability.

16. The device according to claim 14, wherein the decision unit is configured to obtain the specified participation probability by evaluation of a mathematically defined probability function.

17. The device according to claim 13, wherein the communication unit is configured to transmit a report containing information relating to a result of having performed the cooperative spectrum sensing.

* * * * *

UNITED STATES PATENT AND TRADEMARK OFFICE
CERTIFICATE OF CORRECTION

PATENT NO. : 8,509,701 B2  
APPLICATION NO. : 12/990880  
DATED : August 13, 2013  
INVENTOR(S) : Selen et al.

Page 1 of 1

It is certified that error appears in the above-identified patent and that said Letters Patent is hereby corrected as shown below:

In the Specifications

In Column 4, Line 57, delete "is" and insert -- is a --, therefor.

In Column 4, Line 60, delete "is" and insert -- is a --, therefor.

In Column 5, Line 4, delete "is" and insert -- is a --, therefor.

In Column 12, Line 8, delete "bee" and insert -- be --, therefor.

In the Claims

In Column 16, Line 19, in Claim 1, delete "in cooperative" and insert -- in the cooperative --, therefor.

In Column 16, Line 20, in Claim 1, delete "to participation" and insert -- to a specified participation --, therefor.

Signed and Sealed this
Twenty-second Day of April, 2014

Michelle K. Lee
*Deputy Director of the United States Patent and Trademark Office*